United States Patent
Lile et al.

(10) Patent No.: US 12,289,493 B2
(45) Date of Patent: *Apr. 29, 2025

(54) PARTIAL FRAME REPLACEMENT ENABLING MULTIPLE VERSIONS IN AN INTEGRATED VIDEO PACKAGE

(71) Applicant: WARNER BROS. ENTERTAINMENT INC., Burbank, CA (US)

(72) Inventors: Shaun Lile, Burbank, CA (US); Tom David Stratton, Burbank, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,782

(22) Filed: Dec. 22, 2023

(65) Prior Publication Data

US 2024/0137608 A1  Apr. 25, 2024

Related U.S. Application Data

(63) Continuation of application No. 17/298,562, filed as application No. PCT/US2019/064064 on Dec. 2, 2019, now Pat. No. 11,863,818.

(60) Provisional application No. 62/774,064, filed on Nov. 30, 2018.

(51) Int. Cl.
| H04N 21/4402 | (2011.01) |
| H04N 21/235 | (2011.01) |
| H04N 21/262 | (2011.01) |
| H04N 21/8543 | (2011.01) |

(52) U.S. Cl.
CPC ... *H04N 21/44029* (2013.01); *H04N 21/2353* (2013.01); *H04N 21/440245* (2013.01); *H04N 21/26258* (2013.01); *H04N 21/8543* (2013.01)

(58) Field of Classification Search
CPC ......... H04N 21/23439; H04N 21/2353; H04N 21/26258; H04N 21/4348; H04N 21/440245; H04N 21/44029; H04N 21/45452; H04N 21/45455; H04N 21/8543

See application file for complete search history.

(56) References Cited

U.S. PATENT DOCUMENTS

| 7,991,271 | B2 | 8/2011 | Candelore |
| 8,120,636 | B2 | 2/2012 | Nam et al. |
| 10,820,045 | B2 | 10/2020 | Tofigh et al. |
| 2008/0170622 | A1 | 7/2008 | Gordon et al. |
| 2016/0247423 | A1 | 8/2016 | Hohl et al. |
| 2021/0201855 | A1 | 7/2021 | Kammachi-Sreedhar et al. |

FOREIGN PATENT DOCUMENTS

| EP | 1463317 | A2 | 9/2004 |
| KR | 101573482 | B1 | 12/2015 |
| KR | 101624196 | B1 | 5/2016 |
| WO | 2017060423 | A1 | 4/2017 |

*Primary Examiner* — Omar S Parra

(74) *Attorney, Agent, or Firm* — Bookoff McAndrews, PLLC

(57) ABSTRACT

Multiple different versions of media content are contained in a single package of audio-video media content, using compression algorithms that reduce storage and bandwidth required for storing multiple full-resolution versions of the media. Portions of individual frames are replaced during playback so that only the pixels that differ between versions need to be stored.

20 Claims, 8 Drawing Sheets

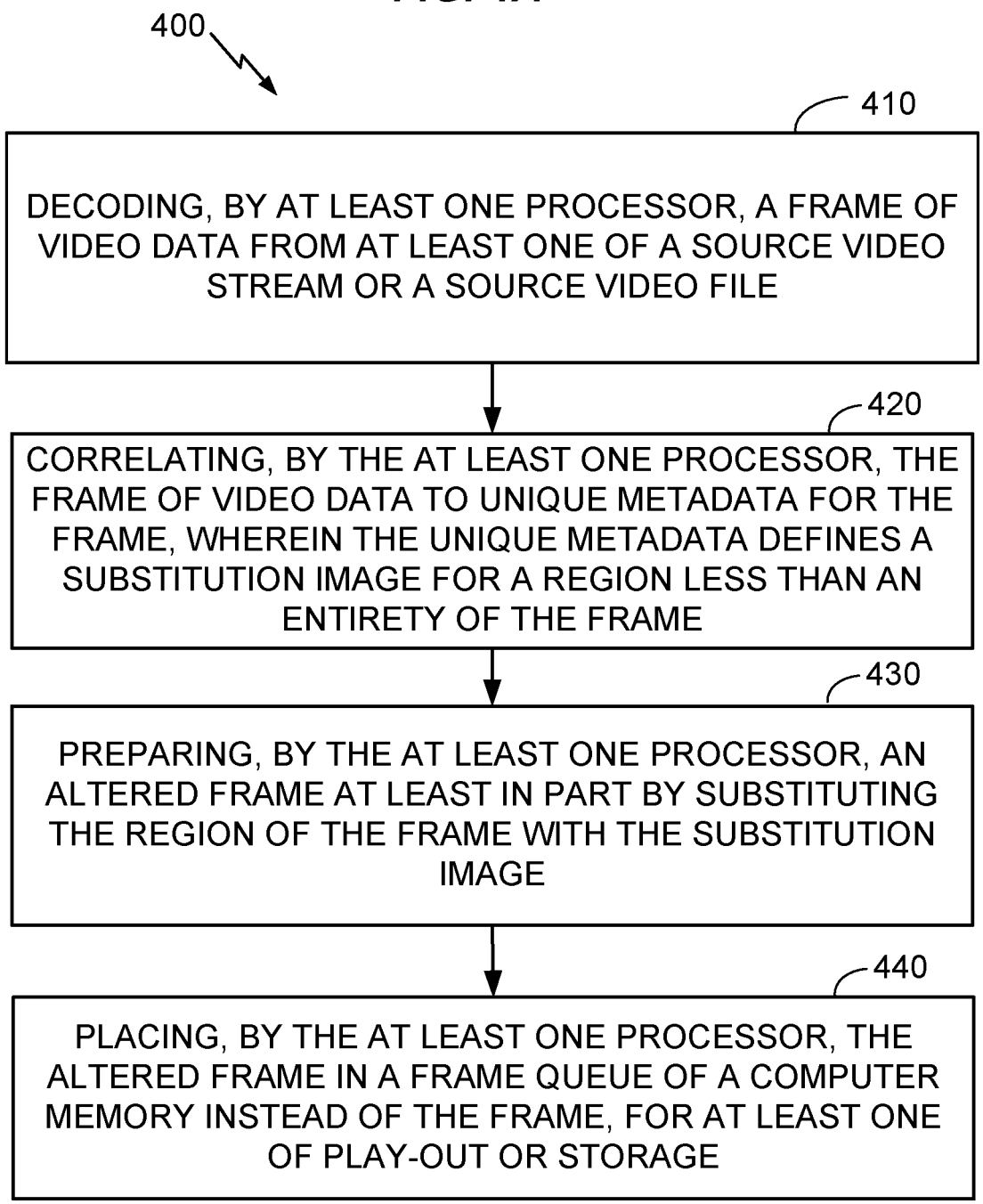

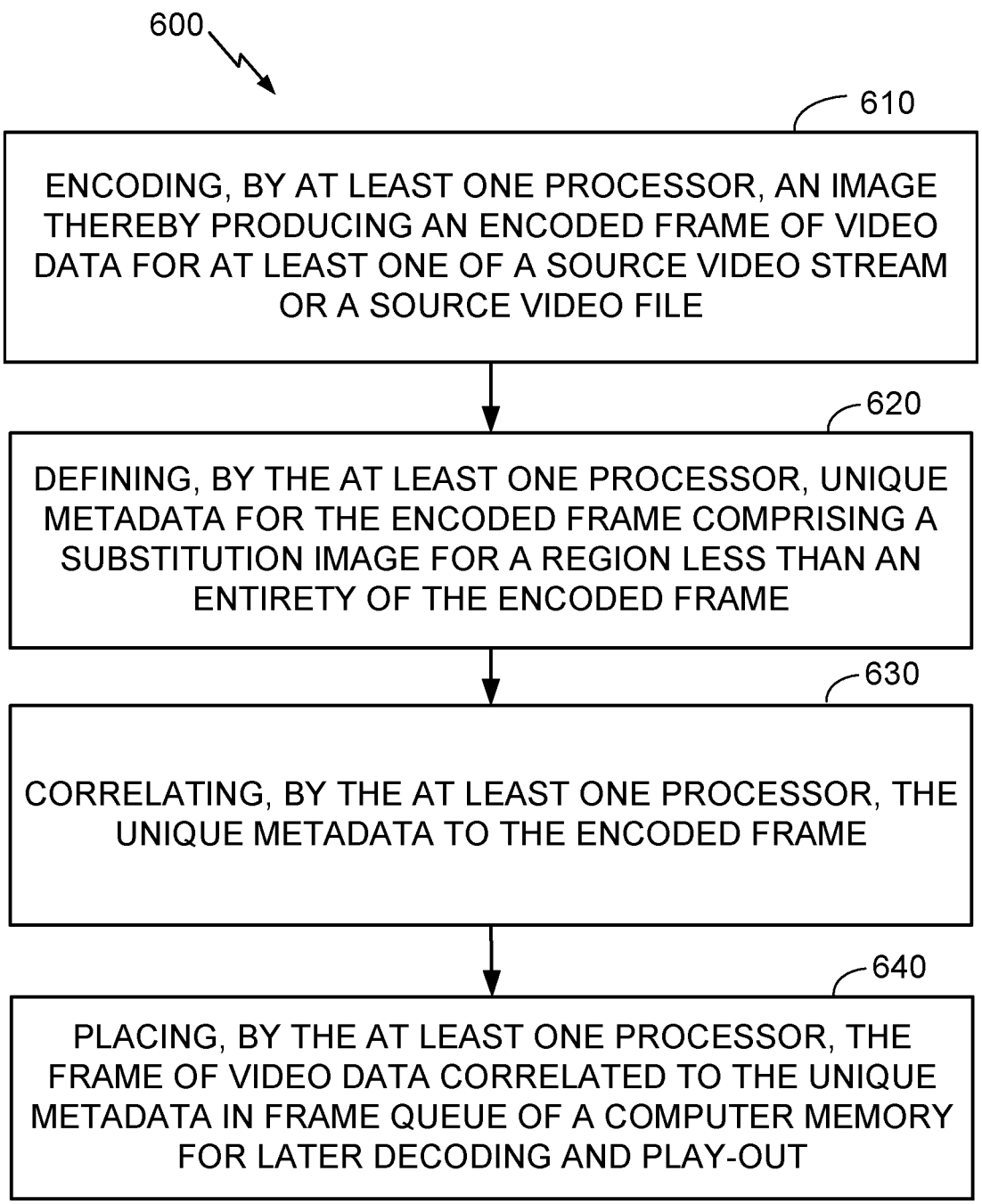

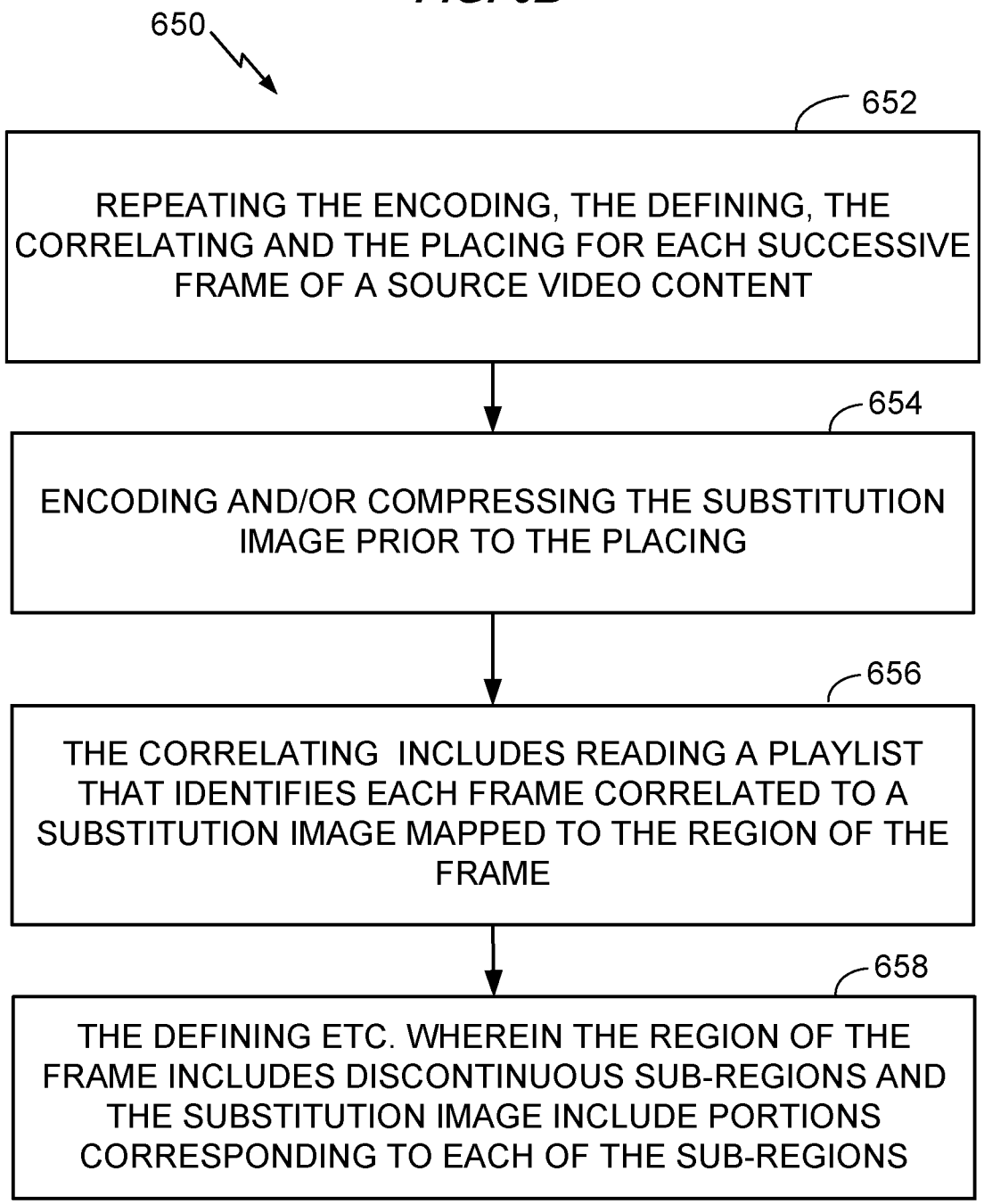

PARTIAL FRAME REPLACEMENT ENABLING MULTIPLE VERSIONS IN AN INTEGRATED VIDEO PACKAGE

CROSS-REFERENCE TO RELATED APPLICATION

The present application claims the benefit of priority to U.S. Non-Provisional patent application Ser. No. 17/298,562, filed on May 29, 2021, which is a 371 national stage entry of PCT/US2019/064064 filed on Dec. 2, 2019, which claims priority to U.S. provisional patent application Ser. No. 62/774,064 filed Nov. 30, 2018, the entire contents of which are incorporated herein by reference.

FIELD

The present application relates to data compression, and more particularly to methods, apparatus and systems for providing different versions of audio-video content in a single package of computer-readable storage medium.

BACKGROUND

Video content produced in an original language for one market is often translated and edited for distribution in other languages and markets. Each different version may include alterations in video frames to adjust for differences, for example, alterations in lip-syncing, translations of text, or application of different censorship standards.

Current technology allows replacement of frames during playback, so frames that are not altered can be used only in the version for with the frame is produced thereby avoiding duplication of stored frames across multiple versions. For example, SMPTE Standard 2067-2:2013 for Interoperable Master Format (SMPTE-IMF) allows substitution of entire frames as "supplemental video inserts" or as "textless tail" inserts to create new videos (e.g., with textless frames, alternate scenes, etc.).

Nonetheless, a large majority of image area may be unaltered in most frames, and a large portion of the total number of frames in a production may be altered. Therefore, current approaches for reducing storage and bandwidth requirements still result in much duplication of image data across multiple frames. It would be desirable, therefore, to reduce this duplication and enable greater efficiency in the storage and transmission of audio-video data packages containing multiple versions.

It would be desirable, therefore, to develop new methods and other new technologies for storing and distributing multiple versions of digital content on computer-readable medium, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, computer-implemented method for playing out video content enabled for substitution of partial-frame image data, may include decoding, by at least one processor, a frame of video data from at least one of a source video stream or a source video file. The method may further include correlating, by the at least one processor, the frame of video data to unique metadata for the frame, wherein the unique metadata defines a substitution image for a region less than an entirety of the frame. The method may further include preparing, by the at least one processor, an altered frame at least in part by substituting the region of the frame with the substitution image and placing, by the at least one processor, the altered frame in a frame queue of a computer memory instead of the frame, for at least one of play-out or storage. The method may be suitable for execution by a player device.

In related aspects, the method may further include repeating the decoding, the correlating, the preparing and the placing for each successive frame of the at least one of a source video stream or a source video file. The method may further include decoding the substitution image from encoded image data from the source stream or file. In an aspect of the method, substituting the region of the frame with the substitution image may include overwriting each pixel of the region with a pixel of the substitution image.

In another aspect, the method may include correlating at least in part by reading a playlist that identifies each frame correlated to a substitution image mapped to the region of the frame. In embodiments of the method, the playlist is, or includes, an XML file.

In another aspect, the unique metadata may also define the location, shape and dimensions of the region, which may be a continuous region or may be divided into discontinuous subregions. In embodiments wherein the region of the frame comprises discontinuous sub-regions, the substitution image may include a portion corresponding to each of the sub-regions.

In a further aspect of the disclosure, a corresponding method for producing video content enabling substitution of partial-frame image data during playback, may include encoding, by at least one processor, an image thereby producing an encoded frame of video data for at least one of a source video stream or a source video file. The method may further include defining, by the at least one processor, unique metadata for the encoded frame comprising a substitution image for a region less than an entirety of the encoded frame. The method may further include correlating, by the at least one processor, the unique metadata to the encoded frame, and placing, by the at least one processor, the frame of video data correlated to the unique metadata in frame queue of a computer memory for later decoding and play-out.

In related aspects, the production method may include repeating the encoding, the defining, the correlating and the placing for each successive frame of a source video content. The method may further include encoding the substitution image.

In an aspect of the production method, the correlating may include generating a playlist that identifies each encoded frame correlated to a substitution image mapped to the region of the encoded frame. In some embodiments, the playlist may be, or may include, an XML file.

In another aspect, the production method may include defining the unique metadata describing a location, shape and extent of the region to be substituted. In embodiments, the region of the encoded frame to be substituted may include discontinuous sub-regions and the substitution image may include a portion corresponding to each of the sub-regions.

As used herein, a "client device" includes at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor. The methods summarized above, and variants thereon, may be encoded as executable instructions for an apparatus including a computer processor coupled to a memory, and held in the memory as executable instructions that when executed by the processor, cause the apparatus to perform operations of the methods described herein.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 4A-4B are flow charts illustrating aspects of a computer-implemented method for decoding video content enabling substitution of partial-frame image data during playback.

FIGS. 6A-6B are flow charts illustrating aspects of a computer-implemented method for producing video content enabling substitution of partial-frame image data during playback.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figure 1:
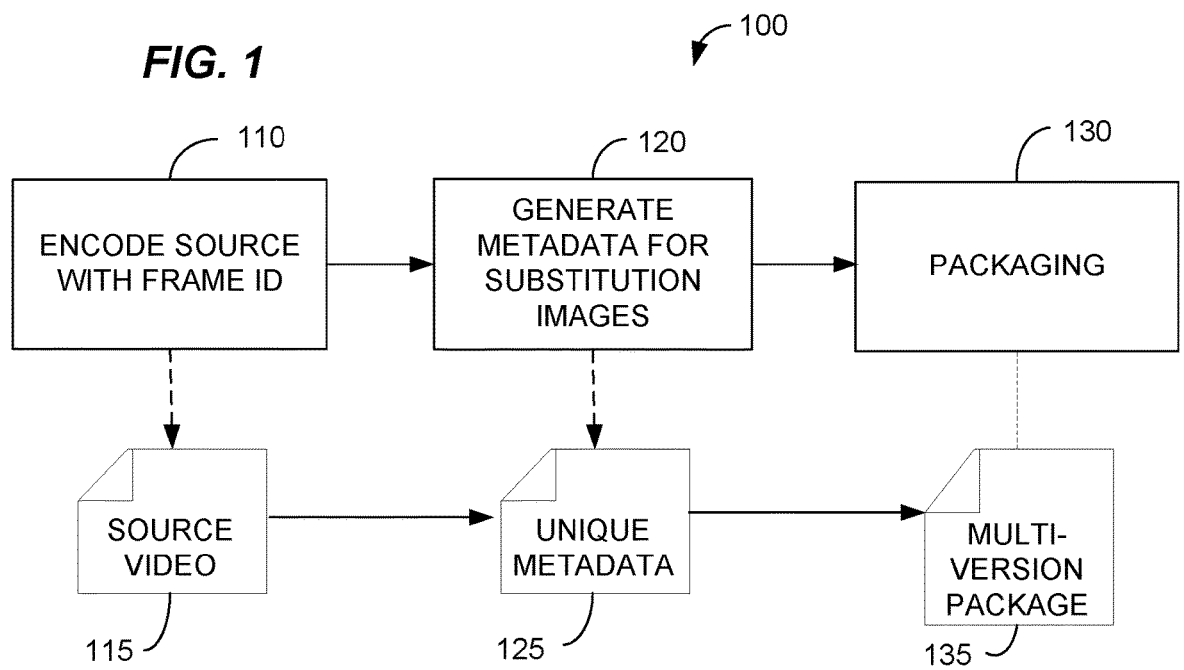
FIG. 1 is a block diagram illustrating an overview of a process for preparing a multi-version package of a computer-readable medium.
Figure 2:
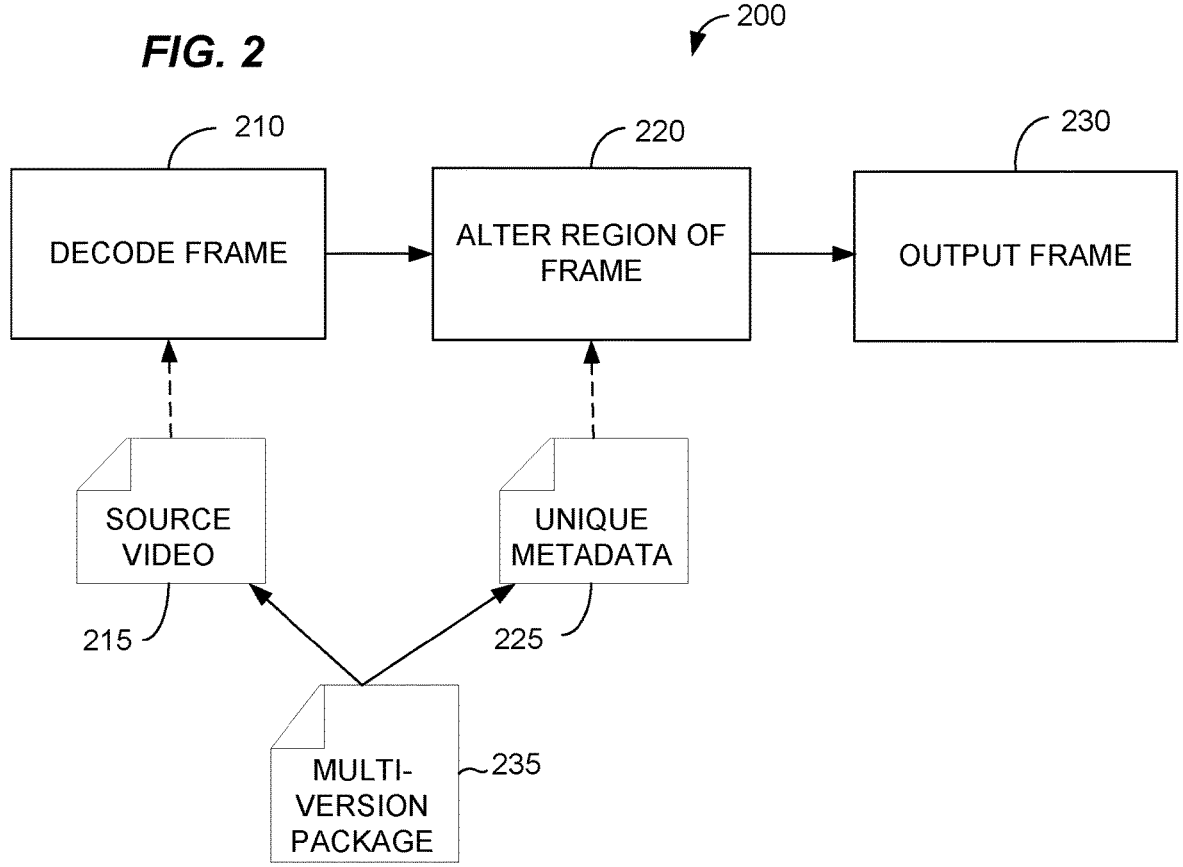
FIG. 2 is a block diagram illustrating an overview of a complementary process for playing out a multi-version package of digital content from a non-transitory computer-readable medium.

Referring to FIGS. 1-2, unique metadata 125, 225 in multi-version packages may be used to determine which frame regions are inserted into the source (primary) content 115, 215, tracking the insertion time or frame number and insertion position for each replacement. By replacing only small sections of individual frames the storage size of the entire package 135, 235 may be reduced compared to keeping multiple, full resolution different versions of content. For example, when localizing motion pictures text may need to be translated (such as on a sign). Current technology using SMPTE-IMF requires that the entire frame be stored in the content package for replacement (textless tail). With this method, only those portions of the frame that are different need to be stored. The methodologies 100, 200 require that the system store only the portions of frames that are different and to replace them on demand instead of replacing entire frames. This reduces the overall size of the package.

A metadata document 125, 225 (e.g., in XML or similar format) including the unique metadata and that describes the content versions that can be created may accompany the package, 135, 125. The document may include instructions for processing that describe the original content and the sections of that content where changes need to be made. The document 125, 135 may further contain a map to the files that represent changed portions, information about where and when to place them into the content. The playback software may read the metadata document and overlay the replacement portions into the correct frame and position. The result is that multiple different versions of the main content can be created from the source 115, 215.

Using the SMTPE Interoperable Mastering Format (IMF) enables replacement of frames in content and create play list style edits for alternate version. The present technology extends the IMF functionality to enable replacement of only a portion of each frame, not an entire frame replacement. In an alternative, a producer may make a video with the pieces to be replaced and then render the rest of the frame as a transparent video (alpha layer). However, the alternative approach requires a player capable of using both video tracks simultaneously lowers bit rate efficiency, besides lacking the essential benefit of reducing the size of the entire package. Thus, an approach like IMF should be advantageous as described in more detail below.

FIG. 1 is a block diagram showing an overview of a process 100 for preparing a multi-version package 135 including a source (e.g., original) video 115 and unique metadata document 125 that contains and maps a replacement region of any frames to be altered. At 110 the processor encodes the source video 115 including an explicit or implicit identifier for each frame, using any suitable encoding method. At 120, the processor generates metadata for substitution images for each frame which and includes the substitution images directly or indirectly (e.g., by linking) into the metadata, each associated with a corresponding frame identifier (e.g., frame number). The substitution images may be provided by a separate process that is beyond the scope of the present disclosure. At 130, the processor integrates the encoded source video 115 into a multi-version package 135 that includes the encoded source video 115 and unique metadata documents 125, one for each version that the package will support. Each additional version increases the size of the package only by its metadata 125, as the source video 115 is the same for each version.

FIG. 2 is a block diagram showing an overview of a complementary process 200 for playing out a multi-version package 235 such as may be prepared using the process 100. At 210, a processor of a media player decodes successive frames of the source video 215. At 220, an image processing module executing on the processor alters regions of frames to be altered based on instructions and substitution images in the unique metadata document 225. At 230, the processor outputs each frame in order, including the altered frames for subsequent play-out.

Figure 3:
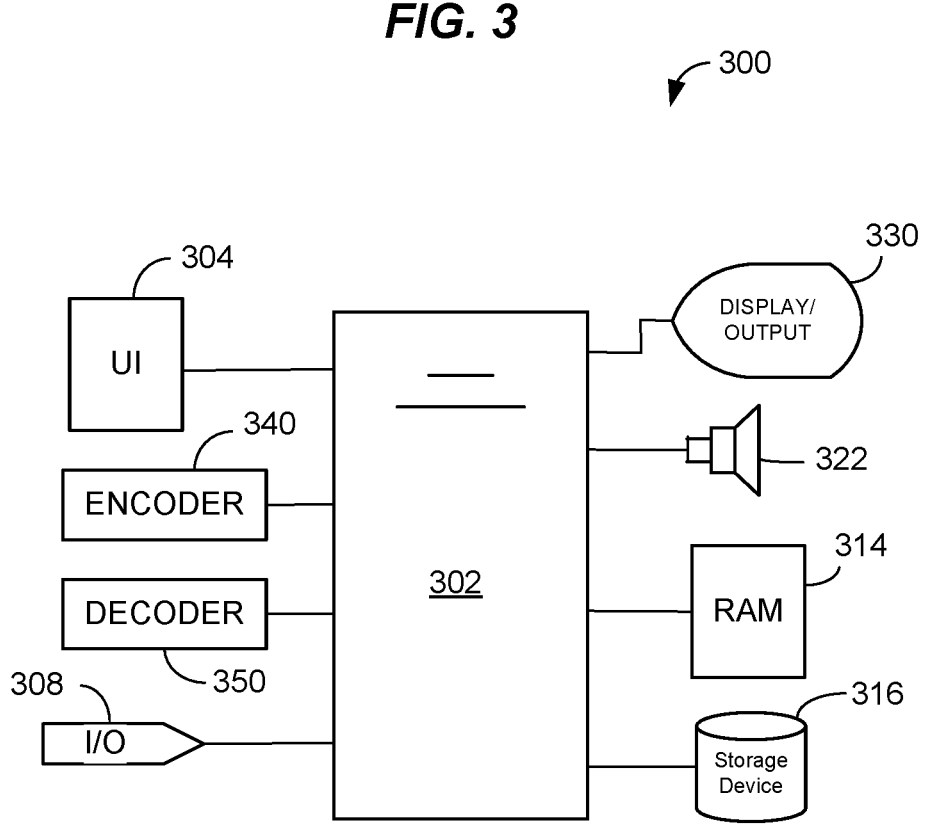
FIG. 3 is a block diagram illustrating aspects of a decoding/encoding apparatus that may be configured as a dedicated media player/decoder or as a dedicated encoder/server.

FIG. 3 shows aspects of a decoding/encoding apparatus 300, which may be configured as a dedicated media player/decoder by omitting the encoder 340, or as a dedicated encoder/server by omitting the decoder 350. When provided with both an encoder 340 and decoder 350, the apparatus 300 may function as either a media player or server depending on the software or firmware it is operating. The apparatus 300 may include a CPU 302 and random-access memory (RAM) 314 holding program instructions and data for execution and processing by the processor 300. When the apparatus 300 is powered off or in an inactive state, program instructions and data may be stored in a long-term memory, for example, a non-volatile magnetic, optical, or electronic memory storage device 316. Either or both RAM 314 or the storage device 316 (for examples) may comprise a non-transitory computer-readable medium holding program instructions, that when executed by the processor 302, cause the apparatus 300 to perform a method or operations as described herein. Program instructions may be written in any suitable high-level language, for example, C, C++, C #, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. Other components of the apparatus 300 may include, for example, a display output 330, audio transducer 320, an input/output port 308 for connecting to a network, and a user interface device 304 for receiving user input that directs initiation of the processes described herein. The illustrated components of the apparatus 300 may be connected to the processor 302 via wired or wireless connections as known in the art. Usually at least the RAM 314 and 302 are mounted to a circuit board or the like and enclosed in a housing.

FIG. 4A is a flow chart showing aspects of a computer-implemented method 400 for decoding video content enabling substitution of partial-frame image data during playback. The method 400 may include, at 410, decoding, by at least one processor, a frame of video data from at least one of a source video stream or a source video file. The method 400 may further include at 420 correlating, by the at least one processor, the frame of video data to unique metadata for the frame, wherein the unique metadata defines a substitution image for a region less than an entirety of the frame. The correlated may include, for example, linking the unique metadata to the frame using a database or other data structure defined for the source medium and known to the processor tasked with the decoding. The method 400 may further include at 430 preparing, by the at least one processor, an altered frame at least in part by substituting the region of the frame with the substitution image. The method 400 may further include at 440 placing, by the at least one processor, the altered frame in a frame queue of a computer memory instead of the frame, for at least one of play-out or storage.

Figure 4B:
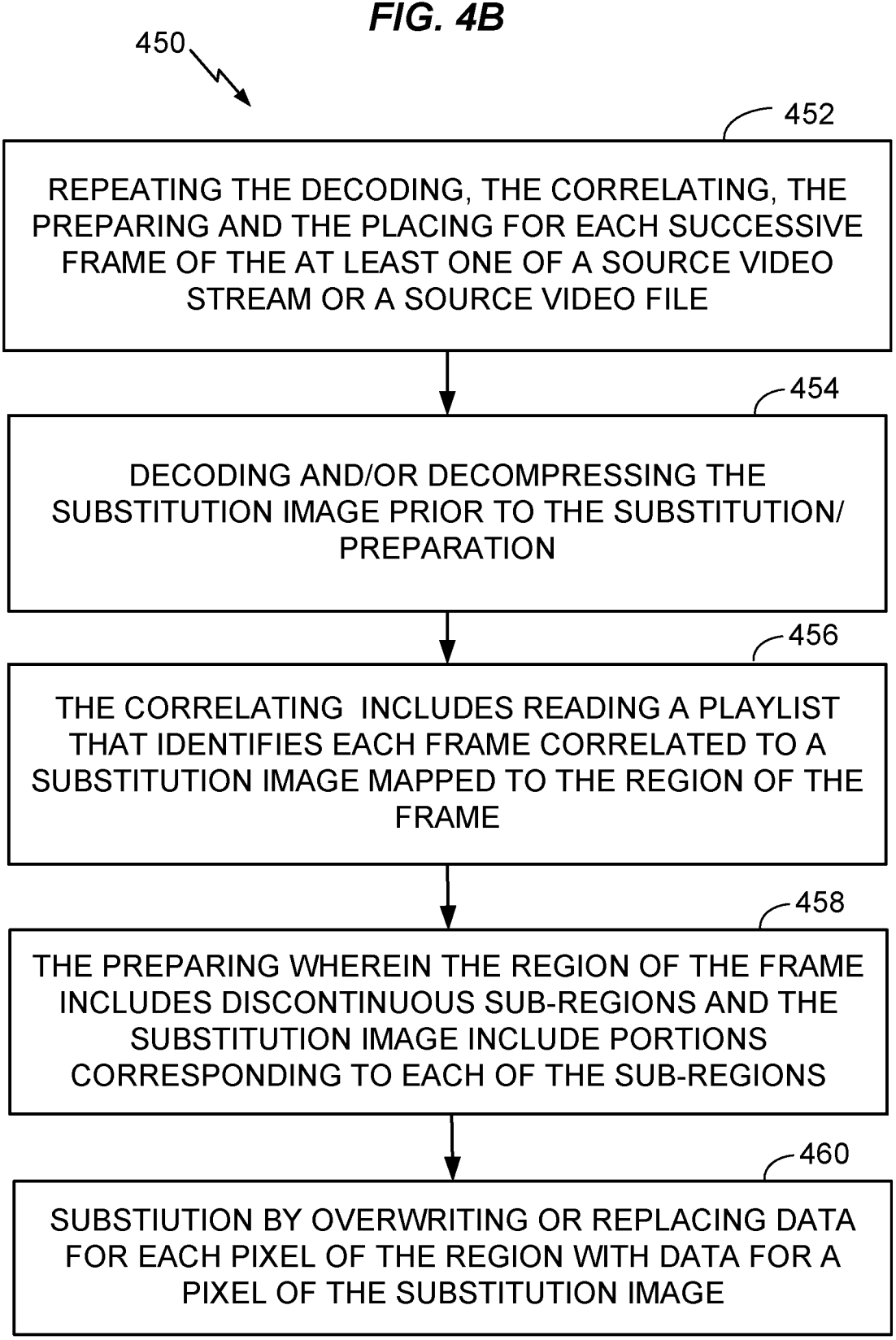

The at least one processor may perform additional operations 450 shown in FIG. 4B in connection with the method 400, as described immediately below. Each of these additional operations 450 is not necessarily performed in every embodiment of the method 400, and the presence of any one of the operations does not necessarily require that any other of these additional operations also be performed. All operations 400, 450 are performed automatically by a computer processor under control of one or more algorithms or procedures encoded in a computer memory. At 452, the method 400 may include repeating the decoding 410, the correlating 420, the preparing 430 and the placing 440 for each successive frame of the at least one of a source video stream or a source video file. At 454, the method may include decoding and/or decompressing the substitution image prior to the substitution/preparation 430. In an aspect of the method diagrammed at 456, the correlating 420 may include reading a playlist that identifies each frame correlated to a substitution image mapped to the region of the frame. In a related aspect, the playlist may be, or may include, an XML file. In another aspect of the method 400 diagrammed at 458, the region of the frame may include discontinuous sub-regions and the substitution image may include a portions corresponding to each of the sub-regions, wherein each of the portions is unique and corresponds to a different one of the sub-regions. Thus, the method may handle more than one alteration per frame without requiring unaltered regions to be duplicated. In another aspect of the method 400 diagrammed at 460, substituting the region of the frame with the substitution image (at 430) may include overwriting each pixel of the region with a pixel of the substitution image.

Figure 5:
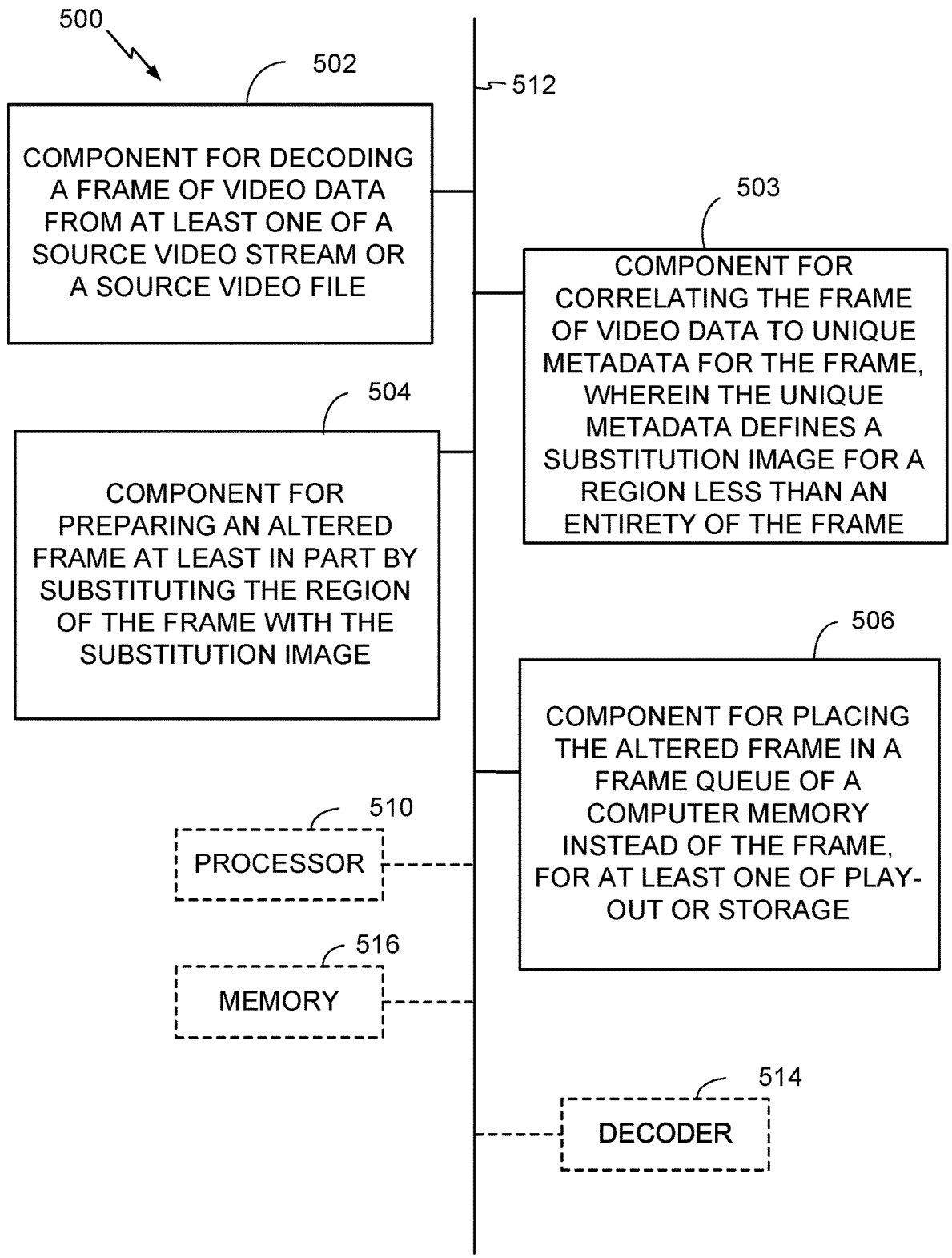
FIG. 5 is a conceptual block diagram illustrating components of an apparatus or system for decoding video content enabling substitution of partial-frame image data during playback.

FIG. 5 is a conceptual block diagram illustrating components of an apparatus or system 500 for decoding video content enabling substitution of partial-frame image data during playback as described herein, according to one embodiment. As depicted, the apparatus or system 500 may include functional blocks that can represent functions implemented by a processor, software, or combination thereof (e.g., firmware).

As illustrated in FIG. 5, the apparatus or system 500 may comprise an electrical component 502 for decoding one or more frames of video data from at least one of a source video stream or a source video file. The component 502 may be, or may include, a means for said decoding. Said means may include the processor 510 coupled to the memory 516, and to the input device 514, the processor executing an algorithm based on program instructions stored in the memory. Such algorithm may include a sequence of more detailed operations, for example, receiving encoded data, determining a decoding algorithm for the encoded data, executing the decoding algorithm, and outputting decoded image data.

The apparatus or system 500 may further comprise an electrical component 503 for correlating the frame of video data to unique metadata for the frame, wherein the unique metadata defines a substitution image for a region less than an entirety of the frame. The component 503 may be, or may include, a means for said correlating. Said means may include the processor 510 coupled to the memory 516, and to the input device 514, the processor executing an algorithm based on program instructions stored in the memory. Such algorithm may include a sequence of more detailed operations, for example, determining a frame sequence number, and looking up the unique metadata based on an index organized by frame sequence number.

The apparatus or system 500 may further comprise an electrical component 504 for preparing an altered frame at least in part by substituting the region of the frame with the substitution image. The component 504 may be, or may include, a means for said preparing. Said means may include the processor 510 coupled to the memory 516, the processor executing an algorithm based on program instructions stored in the memory. Such algorithm may include a sequence of more detailed operations, for example, determining a position and size of one or more regions or subregions in the source image loaded into a memory cache, loading a portion of the substitution image corresponding to each of the one or more subregions into a computer memory, overwriting the cached source with the substitution image, and outputting the resulting altered image.

The apparatus or system 500 may further comprise an electrical component 506 for placing the altered frame in a frame queue of a computer memory instead of the frame, for at least one of play-out or storage. The component 506 may be, or may include, a means for said placing. Said means may include the processor 510 coupled to the memory 516, and to the input device 514, the processor executing an algorithm based on program instructions stored in the memory. Such algorithm may include a sequence of more detailed operations, for example, writing the altered frame in a memory cache, and associating the written frame with a status identifier (implicit or explicit).

The apparatus 500 may optionally include a processor module 510 having at least one processor, in the case of the apparatus 500 configured as a digital signal processor. The processor 510, in such case, may be in operative communication with the modules 502-506 via a bus 512 or other communication coupling, for example, a network. The processor 510 may initiate and schedule the functions performed by electrical components 502-506.

In related aspects, the apparatus 500 may include a decoder 514 for decoding a video stream to obtain image data therefrom. The apparatus 500 may further include a network interface module (not shown) operable for communicating with a storage device over a computer network. In further related aspects, the apparatus 500 may optionally include a module for storing information, such as, for example, a memory device/module 516. The computer readable medium or the memory module 516 may be operatively coupled to the other components of the apparatus 500 via the bus 512 or the like. The memory module 516 may be adapted to store computer readable instructions and data for effecting the processes and behavior of the modules 502-506, and subcomponents thereof, or the processor 510, or one or more of the additional operations 450 described in connection with the method 400 or FIG. 2. The memory module 516 may retain instructions for executing functions associated with the modules 502-506. While shown as being external to the memory 516, it is to be understood that the modules 502-506 can exist within the memory 516.

FIG. 6A is a flow chart showing an example of a computer-implemented method 600 for producing video content enabling substitution of partial-frame image data during playback. The method 600 may include at 610 encoding, by at least one processor, an image thereby producing an encoded frame of video data for at least one of a source video stream or a source video file. The method 600 may further include at 620 defining, by the at least one processor, unique metadata for the encoded frame comprising a substitution image for a region less than an entirety of the encoded frame. The method 600 may further include at 630 correlating, by the at least one processor, the unique metadata to the encoded frame. The method 600 may further include at 640 placing, by the at least one processor, the frame of video data correlated to the unique metadata in frame queue of a computer memory for later decoding and play-out.

The at least one processor may perform additional operations 650 shown in FIG. 6B in connection with the method 600, as described immediately below. Each of these additional operations 650 is not necessarily performed in every embodiment of the method 600, and the presence of any one of the operations does not necessarily require that any other of these additional operations also be performed. All operations 600, 650 are performed automatically by a computer processor under control of one or more algorithms or procedures encoded in a computer memory. In an aspect of the method 600 at 652 may include repeating the encoding 610, the defining 620, the correlating 630 and the placing 640 for each successive frame of a source video content. In another aspect at 654 the method 600 may include encoding and/or compressing the substitution image. At 656, the correlating 630 may include generating a playlist that identifies each encoded frame correlated to a substitution image mapped to the region of the encoded frame. In a related aspect, the playlist may be, or may include, an XML file. In another aspect, at 658, the region of the encoded frame may include discontinuous sub-regions and the substitution image may include a portion corresponding to each of the sub-regions. The defining and correlation operations may be modified accordingly to handle discontinuous sub-regions.

Figure 7:
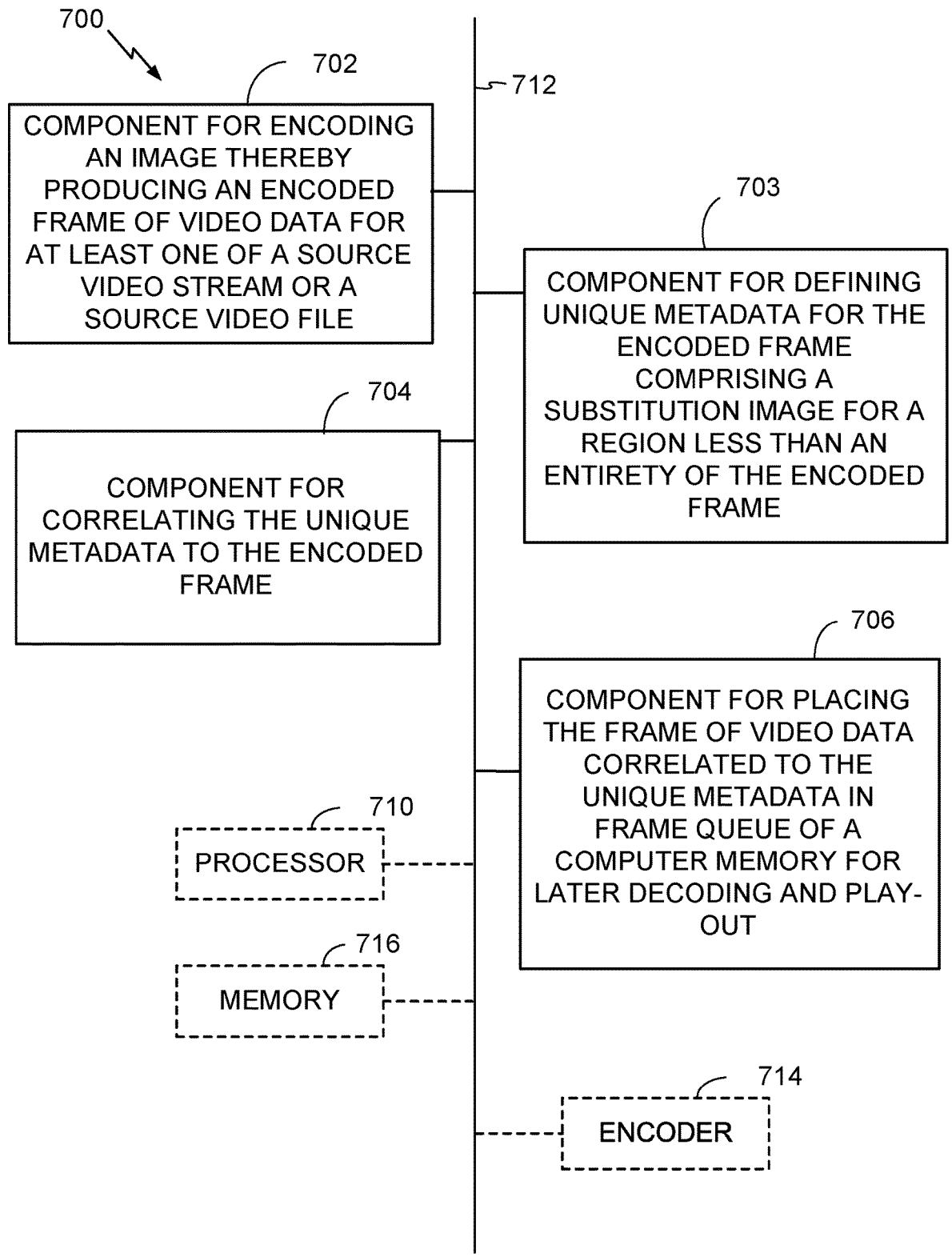
FIG. 7 is a conceptual block diagram illustrating components of an apparatus or system for producing video content enabling substitution of partial-frame image data during playback.

FIG. 7 is a conceptual block diagram illustrating components of an apparatus or system 700 for producing video content enabling substitution of partial-frame image data during playback as described herein, according to one embodiment. As depicted, the apparatus or system 700 may include functional blocks that can represent functions implemented by a processor, software, or combination thereof (e.g., firmware).

As illustrated in FIG. 7, the apparatus or system 700 may comprise an electrical component 702 for encoding an image thereby producing an encoded frame of video data for at least one of a source video stream or a source video file. The component 702 may be, or may include, a means for said encoding. Said means may include the processor 710 coupled to the memory 716, and to the input device 714, the processor executing an algorithm based on program instructions stored in the memory. Such algorithm may include a sequence of more detailed operations, for example, receiving image data, determining an encoding based an intended output medium, executing the determined encoding algorithm on the input data, and outputting a resulting encoded image as part of (e.g., a frame) of a video file or video data.

The apparatus or system 700 may further comprise an electrical component 703 for defining unique metadata for the encoded frame comprising a substitution image for a region less than an entirety of the encoded frame. The component 703 may be, or may include, a means for said defining. Said means may include the processor 710 coupled to the memory 716, and to the input device 714, the processor executing an algorithm based on program instructions stored in the memory. Such algorithm may include a sequence of more detailed operations, for example, reading an alteration database for the source video content that defines a position and geometry of the substation image and luminance/color values for each of its pixels, and automatically generating metadata relating the substitution image to the frame and replacement region (including if present discontinuous subregions).

The apparatus or system 700 may further comprise an electrical component 704 for correlating the unique metadata to the encoded frame. The component 704 may be, or may include, a means for said correlating. Said means may include the processor 710 coupled to the memory 716, the processor executing an algorithm based on program instructions stored in the memory. Such algorithm may include a sequence of more detailed operations, for example, determining a frame identifier for the current frame of the source video and generating a document, file, or other data structure containing the metadata indexed to a frame identifier for the current frame (repeating these operations for each frame).

The apparatus or system 700 may further comprise an electrical component 706 for placing the frame of video data correlated to the unique metadata in frame queue of a computer memory for later decoding and play-out. The component 706 may be, or may include, a means for said placing. Said means may include the processor 710 coupled to the memory 716, and to the input device 714, the processor executing an algorithm based on program instructions stored in the memory. Such algorithm may include a sequence of more detailed operations, for example, compiling the sequence of frames from a frame queue into a document or file, verifying that each frame to be altered in the version has a unique metadata in the metadata structure indexed to a relevant frame of the source video, and including the source video and metadata structure in a package according to a predetermined order or arrangement of data elements.

The apparatus 700 may optionally include a processor module 710 having at least one processor, in the case of the apparatus 700 configured as a digital signal processor. The processor 710, in such case, may be in operative communication with the modules 702-706 via a bus 712 or other communication coupling, for example, a network. The processor 710 may initiate and schedule the functions performed by electrical components 702-706.

In related aspects, the apparatus 700 may include an encoder 714 for encoding a succession of images as video data. The apparatus may include a network interface device (not shown) operable for communicating with a storage device over a computer network. In further related aspects, the apparatus 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 710, or one or more of the additional operations 650 described in connection with the method 600 or FIG. 1. The memory module 716 may retain instructions for executing functions associated with the modules 702-706. While shown as being external to the memory 716, it is to be understood that the modules 702-706 can exist within the memory 716.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure. For example both apparatus 500, 700 may be combined in a single apparatus 300 depicted above.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), virtual reality or augmented reality headgear, and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A system for substituting frame image data, comprising:
    at least one memory storing processor-readable instructions; and
    at least one processor configured to access the at least one memory and execute the processor-readable instructions to perform operations, the operations comprising:
        encoding at least one of a source video stream or a source video file with a frame identifier, the encoded at least one of the source video stream or the source video file including an encoded frame of video data;
        generating unique metadata associated with a replacement region of the encoded frame, the unique metadata defining a substitution image for the replacement region; and
        transmitting the encoded frame of video data to a user media device for decoding the encoded frame of video data to generate a decoded frame linked with the unique metadata, to enable generating an altered frame at least in part by substituting the replacement region with the substitution image.

2. The system of claim 1, wherein the decoded frame is linked to the unique metadata based on a database or other data structure defined for the at least one of the source video stream or the source video file.

3. The system of claim 1, wherein the encoded at least one of the source video stream or the source video file and the unique metadata are packaged into a multi-version package.

4. The system of claim 1, the operations further comprising:
    decoding and/or decompressing the substitution image prior to the generating the altered frame.

5. The system of claim 1, the operations further comprising:
    correlating the replacement region to the substitution image based on the frame identifier.

6. The system of claim 5, wherein the correlating includes reading a playlist that identifies one or more frames correlated to the substitution image.

7. The system of claim 6, wherein the playlist includes an XML file.

8. The system of claim 1, wherein the replacement region includes discontinuous sub-regions, and the substitution image includes one or more portions corresponding to at least one of the discontinuous sub-regions.

9. The system of claim 8, wherein the one or more portions include a plurality of portions, each of the plurality of portions being unique and corresponding to a different one of the discontinuous sub-regions.

10. The system of claim 1, wherein the substituting the replacement region with the substitution image includes overwriting each pixel of the replacement region with a pixel of the substitution image.

11. The system of claim 1, further comprising:
    placing the altered frame in a frame queue of the at least one memory instead of the decoded frame, for at least one of play-out or storage.

12. The system of claim 1, wherein:
    the encoded frame is a first frame;
    the encoded at least one of the source video stream or the source video file further includes one or more encoded frames of the video data successive to the first frame, the one or more encoded frames being encoded with corresponding one or more frame identifiers; and
    the unique metadata is further associated with a replacement region of each of the one or more encoded frames, the unique metadata defining a separate substitution image for the replacement region of each of the one or more encoded frames;
    the operations further comprising:
        decoding the one or more encoded frames of video data to generate one or more decoded frames, the one or more decoded frames being linked with the unique metadata;
        generating one or more altered frames at least in part by substituting the replacement region of each of the one or more encoded frames with the separate substitution image; and
        placing the one or more altered frames in a frame queue of the at least one memory instead of the one or more decoded frames, for at least one of play-out or storage.

13. A computer-implemented method for substituting frame image data, comprising:
    encoding, by at least one processor, at least one of a source video stream or a source video file with a frame identifier, the encoded at least one of the source video stream or the source video file including an encoded frame of video data;
    generating, by the at least one processor, unique metadata associated with a replacement region of the encoded frame, the unique metadata defining a substitution image for the replacement region; and
    transmitting the encoded frame of video data to a user media device for decoding the encoded frame of video data to generate a decoded frame linked with the unique metadata, to enable generating an altered frame at least in part by substituting the replacement region with the substitution image.

14. The computer-implemented method of claim 13, further comprising:
    placing, by the at least one processor, the altered frame in a frame queue of at least one memory having processor-readable instructions stored therein, instead of the decoded frame, for at least one of play-out or storage, wherein the at least one processor is configured to access the at least one memory.

15. The computer-implemented method of claim 13, further comprising:
correlating the replacement region to the substitution image based on the frame identifier.

16. The computer-implemented method of claim 15, wherein the correlating includes reading a playlist that identifies one or more frames correlated to the substitution image, the playlist including an XML file.

17. The computer-implemented method of claim 13, wherein the replacement region includes discontinuous sub-regions, and the substitution image includes one or more portions corresponding to at least one of the discontinuous sub-regions.

18. The computer-implemented method of claim 17, wherein the one or more portions include a plurality of portions, each of the plurality of portions being unique and corresponding to a different one of the discontinuous sub-regions.

19. A non-transitory computer-readable medium storing a set of instructions that, when executed by at least one processor, cause the at least one processor to perform operations comprising:
encoding at least one of a source video stream or a source video file with a frame identifier, the encoded at least one of the source video stream or the source video file including an encoded frame of video data;
generating unique metadata associated with a replacement region of the encoded frame, the unique metadata defining a substitution image for the replacement region; and
transmitting the encoded frame of video data to a user media device for decoding the encoded frame of video data to generate a decoded frame linked with the unique metadata, to enable generating an altered frame at least in part by substituting the replacement region with the substitution image.

20. The non-transitory computer-readable medium of claim 19, the operations further comprising:
placing the altered frame in a frame queue instead of the decoded frame, for at least one of play-out or storage.

* * * * *

UNITED STATES PATENT AND TRADEMARK OFFICE
CERTIFICATE OF CORRECTION

| | | |
|---|---|---|
| PATENT NO. | : 12,289,493 B2 | Page 1 of 1 |
| APPLICATION NO. | : 18/394782 | |
| DATED | : April 29, 2025 | |
| INVENTOR(S) | : Shaun Lile and Tom David Stratton | |

It is certified that error appears in the above-identified patent and that said Letters Patent is hereby corrected as shown below:

In the Specification

In Column 1, Line 8, after "application" insert --is a continuation of and--

Signed and Sealed this
Twenty-fifth Day of November, 2025

John A. Squires
*Director of the United States Patent and Trademark Office*